(12) United States Patent
Vetrovec (10) Patent No.: US 7,628,144 B2
(45) Date of Patent: Dec. 8, 2009

(54) SUPERCHARGED INTERNAL COMBUSTION ENGINE SYSTEM (75) Inventor: Jan Vetrovec, Larkspur, CO (US)

(73) Assignee: Aqwest LLC, Larkspur, CO (US)

(*) Notice: Subject to any disclaimer, the term of this patent is extended or adjusted under 35 U.S.C. 154(b) by 89 days.

(21) Appl. No.: 11/655,441

(22) Filed: Jan. 19, 2007

(65) Prior Publication Data
US 2007/0125346 A1 Jun. 7, 2007

Related U.S. Application Data (63) Continuation-in-part of application No. 11/443,424, filed on May 29, 2006, which is a continuation of application No. 11/028,244, filed on Jan. 2, 2005, now Pat. No. 7,076,952.

(51) Int. Cl.
F02B 33/00 (2006.01)
F02B 9/04 (2006.01)
F02M 15/00 (2006.01)
F17D 1/04 (2006.01)

(52) U.S. Cl. ............ 123/559.1; 123/541; 123/542

(58) Field of Classification Search ......... 123/559.1, 123/585, 542, 545, 540, 590; 60/605.1, 611; 62/5; F02B 9/04; F17D 1/04
See application file for complete search history.

(56) References Cited

U.S. PATENT DOCUMENTS

| 2,907,174 | A | * | 10/1959 | Hendal | ............ | 62/5 |
| 2,965,083 | A | * | 12/1960 | Percival | ............ | 123/559.1 |
| 2,983,267 | A | * | 5/1961 | Percival | ............ | 123/559.1 |
| 3,020,901 | A | | 2/1962 | Cook | ............ | 123/559.1 |
| 3,173,273 | A | * | 3/1965 | Fulton | ............ | 62/5 |
| 3,208,229 | A | * | 9/1965 | Fulton | ............ | 62/5 |
| 3,673,796 | A | | 7/1972 | Weich et al. | ............ | 372/58 |

(Continued)

FOREIGN PATENT DOCUMENTS

JP 57056623 A * 4/1982

(Continued)

OTHER PUBLICATIONS

McGraw-Hill Dictionary of Scientific and Technical Terms, 6th ed., p. 2069, McGraw-Hill Companies, Inc., New York, 2003.

(Continued)

Primary Examiner—Thai Ba Trieu (57) ABSTRACT

A supercharged internal combustion engine system wherein during periods of high power demand the weight of combustion chamber charge is increased by cooling intake air in a vortex tube operated by high-pressure air from a storage tank. In addition to increasing engine output power, cold air intake also reduces engine pre-ignition (knocking) thereby reducing emissions. Included are means for sensing engine power demand and controlling the supercharging action. Output of the vortex tube may be also used to operate an ejector pump which further compresses intake air and increases charge weight. During periods of natural aspiration the ejector pump can be by-passed to reduce flow impedance. Effective supercharging is achieved even at low engine speeds. One of the objects of the invention is to obtain more power from small displacement ICE and thus providing automotive vehicles with sufficient acceleration in addition to good fuel economy. Another object of the invention is to enhance turbocharged engines and reduce their response lag.

21 Claims, 7 Drawing Sheets

U.S. PATENT DOCUMENTS

| | | | |
|---|---|---|---|
| 4,612,646 A | 9/1986 | Zerr | 62/5 |
| 4,840,164 A * | 6/1989 | Parsons | 123/559.1 |
| 5,299,547 A | 4/1994 | Michimasa | 60/611 |
| 5,558,069 A * | 9/1996 | Stay | 123/541 |
| 5,561,982 A | 10/1996 | Tunkel et al. | 62/5 |
| 5,911,740 A | 6/1999 | Tunkel et al. | 62/5 |
| 6,247,460 B1 | 6/2001 | Lindberg et al. | 60/605.2 |
| 6,289,679 B1 | 9/2001 | Tunkel et al. | 123/563 |
| 6,895,752 B1 | 5/2005 | Holman | 60/611 |
| 6,922,997 B1 | 8/2005 | Larson et al. | 60/599 |
| 7,076,952 B1 | 7/2006 | Vetrovec | 60/605.1 |
| 7,198,036 B2 * | 4/2007 | White | 123/542 |
| 7,305,834 B2 * | 12/2007 | Bhatti | 62/5 |
| 2005/0045033 A1 * | 3/2005 | Nicol et al. | 95/269 |
| 2006/0168958 A1 | 8/2006 | Vetrovec | |
| 2008/0209914 A1 * | 9/2008 | De Wergifosse et al. | 62/5 |

FOREIGN PATENT DOCUMENTS

| | | | |
|---|---|---|---|
| JP | 57059022 A | | 4/1982 |
| JP | 57210154 A | | 12/1982 |
| JP | 2002066724 A | * | 3/2002 |
| KR | 2004050326 A | * | 6/2004 |
| KR | 2005070395 A | * | 7/2005 |
| RU | 2090774 C1 | * | 9/1977 |
| RU | 2175739 C1 | * | 11/2001 |
| SU | 1031672 A | * | 7/1983 |
| WO | WO 2006/076167 | | 7/2006 |
| WO | WO 2007064243 A1 | * | 6/2007 |

OTHER PUBLICATIONS

R.H. Perry and C.H. Chilton, "Chemical Engineer's Handbook," pp. 6-29 to 6-32, McGraw-Hill Book Co., Inc., New York, 1973.

G.L. Weissler and R.W. Carlson, "Vacuum Physics and Technology," Ch. 4.3.5 "Ejectors," pp. 136-138, Academic Press, New York, 1979.

B.K. Ahlborn et al, "The Vortex Tube as a Classic Thermodynamic Refrig. Cycle," J. of Appl Phys., vol. 88, No. 6, pp. 3645-3653, Sep. 15, 2000.

B.R. Belostotskiy et al. "Vortex-Flow Cooled Laser," published in Soviet Jour. of Optical. Technol, vol. 35, No. 1, pp. 450-452, Jan.-Feb. 1968.

N. Heintz et al. "An Approach to Torque Based Engine Management Systems," SAE Paper No. 2001-01-0269, 2001.

T. Jaine et al., "High Frequency IMEP Estimation and Filtering for Torque Based SI Engine Control," SAE Paper No. 2002-01-1276, 2002.

S.A. Skebe et al.,"Parameter Effects on Mixer-Ejector Pumping Perform.," paper No. AIAA-88-0188, publ. by AIAA, Washington, DC, Jan. 11, 1988.

T.G. Tillman et al., "Supersonic Nozzle Mixer Ejector," J. of Propulsion and Power, vol. 8, No. 2, pp. 513-519, Mar.-Apr. 1992.

A.K. Narayanan et al."Supersonic-Ejector Characterist. Using Petal Nozzle," J. of Prop. and Power, vol. 10, No. 5, pp. 742-744, Sep.-Oct. 1994.

* cited by examiner

SUPERCHARGED INTERNAL COMBUSTION ENGINE SYSTEM

CROSS-REFERENCE TO RELATED APPLICATIONS

This application is a continuation in-part of prior U.S. application Ser. No. 11/443,424 filed on May 29, 2006 entitled SUPERCHARGED INTERNAL COMBUSTION ENGINE which is a continuation of a prior U.S. application Ser. No. 11/028,244 filed on Jan. 02, 2005 entitled SUPERCHARGED INTERNAL COMBUSTION ENGINE which has issued on Jul. 18, 2006 as U.S. Pat. No. 7,076,952.

FIELD OF THE INVENTION

This invention relates generally to superchargers for use with internal combustion engines and, more particularly, to superchargers for small displacement engines capable of fast response to power demand and delivering high boost during low engine speed.

BACKGROUND OF THE INVENTION

Overview: One of the long-term goals of the automotive manufacturers is to reduce fuel consumption and emissions of modern automotive vehicles powered by internal combustion engines (ICE) while increasing engine efficiency. One approach to reaching this goal is reducing the ICE displacement. However, smaller engines having reduced swept volume typically exhibit insufficient power and torque when operating with normal aspiration. This problem can be remedied by supercharging. It is well known in the art that ICE power output increases with increased weight of air ingested into engine cylinders and available for combustion. Weight of air ingested into engine cylinders can be increased by either 1) increasing the pressure of intake air beyond what can be accomplished by natural aspiration or by 2) cooling the intake air or 3) by a combination of 1) and 2). Therefore, a supercharged ICE receives combustion air with higher density than a normally aspirated ICE. As a result, supercharging allows generating increased power from an engine of a given displacement or, generating a given power output from an engine of smaller size, weight, cost, and emissions.

Superchargers: Supercharges have long been utilized for boosting the power output of ICE's of each spark ignition and compression ignition (diesel) type. Superchargers can be generally classified according to their source of motive power as engine-driven and exhaust gas turbine-driven. The latter are also know as turbochargers. Modern engine-driven supercharger is a positive displacement pump (e.g., Roots blower, vane compressor, or a screw compressor) mechanically coupled to the engine. One limitation of engine-driven superchargers is the low volumetric output at low engine speeds which translates to insufficient torque and poor vehicle acceleration. While this may be remedied by a variable speed drive, the penalty is an increase in complexity and cost. In addition, engine-driven supercharger requires significant ICE power to operate and this power must be supplied at the least opportune moment, namely during high demand on ICE output. As a result, ICE output power available for propulsion is reduced by the amount required to operate the supercharger. Finally, an engine-driven supercharger must be engaged in a controlled manner to avoid a sudden surge in ICE intake pressure and the consequential sudden surge in output torque. This often requires a complex control system.

An exhaust gas turbocharger typically includes a turbine and a centrifugal compressor on a common shaft. The turbine is rotated by exhaust gases from the engine and spins the compressor. The compressor receives intake air, compresses it, and supplies it to ICE combustion chamber(s). Turbochargers provide the advantages of relatively smooth transitions from natural aspiration to supercharged operation while utilizing some of the residual energy of hot exhaust gas, which would otherwise be largely wasted. One drawback of a turbocharged engine is a slow response time known as the "turbo-lag" which is caused by the low pressure and low quantity of exhaust gases at low engine speeds. Consequently, a standard exhaust gas turbocharger is only effective above about 1800 rpm of the ICE. This means that a small displacement ICE equipped with a turbocharger is susceptible to insufficient torque at low engine speeds. Quick acceleration of the turbocharger to normal operating speed is further impeded by the turbocharger rotational inertia. These problems may be corrected in-part by the use of a variable nozzle turbine, which alters the cross-sectional area through which the exhaust gas flows in accordance with engine speed. While this approach recovers some of the intake air pressure lost to low ICE speed, it adds complexity and cost, and reduces reliability.

Recently, an electrically-assisted turbocharger (also known as the "e-turbo") has been proposed to remedy the turbo lag. Since the e-turbo makes supercharging independent of engine speed, it promises to virtually eliminate the turbo lag. Generally, in the e-turbo, electric power drawn from vehicle electric system (e.g., battery) is provided to an electric motor which spins a turbo-compressor. There are two different types of e-turbo known in the automotive industry. The first type of e-turbo is formed by directly coupling an electric motor to the shaft of a conventional exhaust turbocharger, as disclosed, for example, by Kawamura in U.S. Pat. No. 4,958,497. A drawback of this approach is that during acceleration of the e-turbo to operational speed the electric motor has to overcome the compound inertia of both the turbo-compressor and the exhaust turbine while additionally being exposed to very high temperatures. The second type of e-turbo is formed by coupling an electric motor to a turbo-compressor, as disclosed, for example, by Woolenberger et al., in U.S. Pat. No. 6,079,211. This type of an e-turbo can be used in series or in parallel with a conventional turbocharger to reduce turbocharging lag and to increase torque at low ICE speeds, such as disclosed, for example, by Hoecker et al., in U.S. Pat. No. 6,889,503. However, both e-turbo approaches face the challenge of attaining the extremely fast startup and acceleration to reach operating speeds of 50,000 to 70,000 revolutions per minute (rpm) in less than one second. To meet this challenge may require ultrahigh power electronics and electric power source combined with sophisticated computer control. In particular, according to an article authored by Thomas Kattwinkel et al. entitled "Mechatronic Solution for Electronic Turbocharger" SAE paper number 2003-01-0712 published by the Society of Automotive Engineers, Inc., Warrendale, Pa., the e-turbo electric demand cannot be satisfactorily met with a standard 12 volt automotive battery system unless additional intermediate electric energy storage (e.g., super-capacitors) is provided.

Supercharging with Compressed Air from Storage Tank: Another approach to supercharging ICE during period of increased power demand is to provide the ICE with compressed air from a storage tank in lieu of normal aspiration as disclosed, for example, by Weich et al. in U.S. Pat. No. 3,673,796. In this approach, a near instantaneous supercharger response to power demand may be obtained. One disadvantage of this approach is that the potential energy in compressed air is largely wasted because the air is vented from the storage tank at high pressure to ICE intake which is at a much lower pressure. This disadvantage may be overcome by employing an ejector operated by compressed air to pump ambient air into ICE intake such disclosed by the Applicant in U.S. Pat. No. 7,076,952. As compressed air flows through a driving nozzle of the ejector, it forms as high-velocity air stream which entrains some of the surrounding air and forces it into ICE intake thereby increasing ICE intake air pressure. Ejector thus converts potential energy of compressed air in the storage tank into kinetic energy of the nozzle flow which is then converted back into potential energy of pressurized intake air. Because ICE intake air is a mixture of air flowing through the ejector driving nozzle and the air pumped by the nozzle flow, the amount of compressed air required to operate an ejector supercharger is considerably smaller than if compressed air was merely vented from a storage tank into ICE intake.

Ejector pumps are widely used in industry for pumping liquids and gases, see for example, R. H. Perry and C. H. Chilton, "Chemical Engineer's Handbook," $5^{th}$ edition, Chapter 6, Section "Ejectors," pages 6-29 to 6-32, published by McGraw-Hill Book Company, New York, N.Y., 1973, and G. L. Weissler and R. W. Carlson (editors), "Vacuum Physics and Technology," Chapter 4.3.5: Ejectors, pages 136 to 138, published by Academic Press, New York, N.Y., 1979. One key advantage of ejector pumps is that they are mechanically simple as they have no pistons, rotors, or other moving components. Ejector based supercharger may provide a nearly instantaneous response to power demand and it also offers smooth transition from natural ICE aspiration to supercharged condition. Furthermore, air compression by ejectors is nearly isothermal and, therefore, an intercooler commonly used with engine driven superchargers and exhaust gas turbochargers may not be required. Ejectors which produce output flow at above ambient atmospheric pressure are also known as thermo-compressors. Superchargers employing ejectors with a straight or converging nozzle produce only subsonic or sonic flow and, therefore have only a very limited compression capability. A considerably higher compression can be attained by an ejector-based supercharger having a supersonic nozzle flow.

Figure 1:
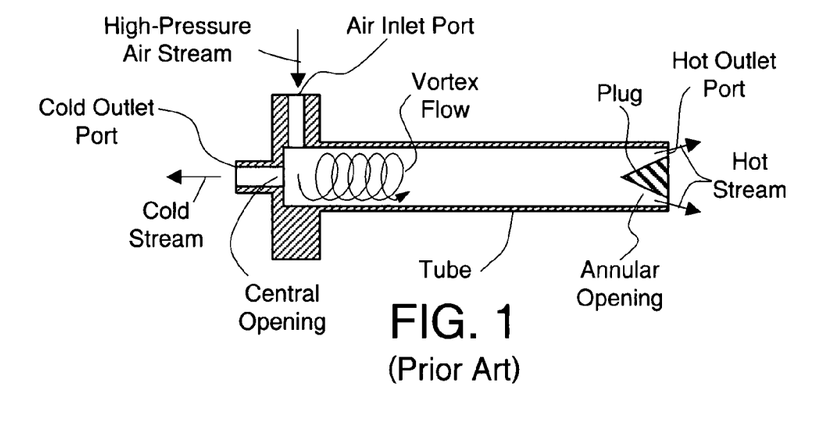
FIG. 1 is a cross-sectional view of a vortex tube of prior art suitable for concurrent generation of hot and cold output streams.
Figure 2A:
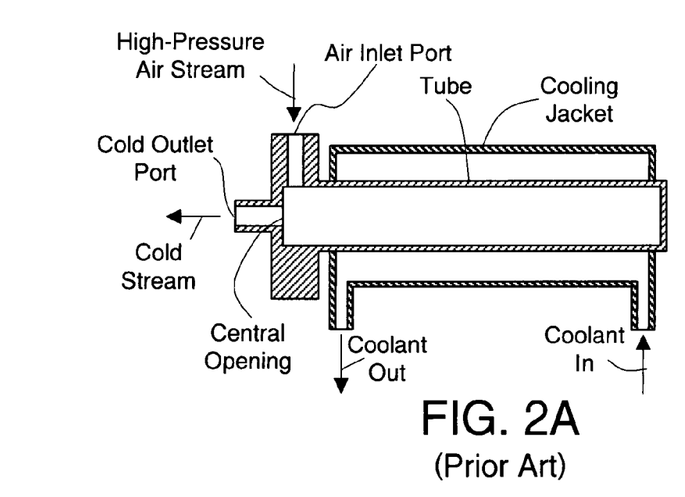
FIG. 2A is a cross-sectional view of a vortex tube of prior art suitable for generation of cold output stream only.
Figure 2B:
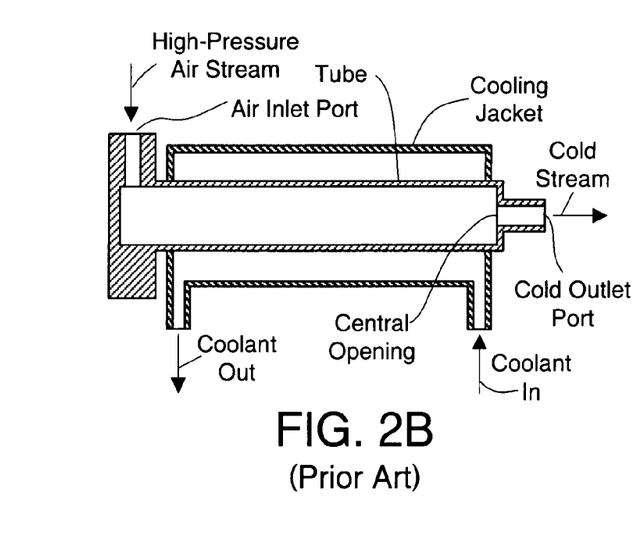
FIG. 2B is a cross-sectional view of an alternative vortex tube of prior art suitabled for generation of cold output stream only.

Vortex Tube for Cooling of ICE Intake Flow: It has been already stated above that reduction of ICE charge temperature increases the charge density and thus increases ICE capacity to produce more power. In addition, reduced charge temperature is known to cut ICE emissions by decreasing charge pre-ignition also known as knocking. Vortex tube is a well known cooling device in the art of refrigeration. Traditional vortex tube comprises a slender tube having one end closed except for a small a central opening and the other end plugged except for an annular opening which may be adjusted in size for flow control, see FIG. 1. A stream of high-pressure air (or other suitable gas) is injected through an inlet port tangentially into the tube in the proximity of the central opening. Resulting vortex flow pattern inside the tube separates the input air stream into a relatively hot air stream which exits through the annular opening and a relatively cold air stream which exits through the central opening and the cold outlet port. Relative flow rates and temperatures of these two streams are typically adjustable by controlling the flow of the hot exhaust stream. See, for example, article entitled "The Vortex Tube as a Classic Thermodynamic Refrigeration Cycle," by B. K. Ahlbom et al., published in Journal of Applied Physics, Volume 88, Number 6, pp. 3645-3653, Sep. 15, 2000. A variant of the traditional vortex tube suitable for generating only a cold output stream can be produced by entirely closing one of the tube ends combined with active cooling of the tube exterior surface such as shown in FIGS. 2A and 2B and disclosed, for example, by Zerr in U.S. Pat. No. 4,612,646. Suitable cooling may be provided by a cooling jacket which may envelop the tube exterior surface. Suitable coolants may be provided in liquid or gaseous form. The exterior surface of the tube can be further provided with surface extensions to facilitate improved heat transfer as disclosed, for example, by Tunkel et al. in U.S. Pat. No. 5,911,740. Vortex tube may also exhaust flow into pressures below atmospheric pressure as disclosed, for example, by B. R. Belostotskiy et al. in an article "Vortex-Flow Cooled Laser," published in Soviet Journal of Optical Technology, volume 35, number 1, pp. 450-452, January-February 1968, and by Tunkel et al. in U.S. Pat. No. 5,561,982.

Lindberg et al. in U.S. Pat. No. 6,247,460 discloses an ICE having a vortex tube for cooling intake air. Lindbergh's vortex tube generates both cold and hot outputs with only the cold output supplied to ICE intake. All of the intake air flows through the vortex tube at all times. When used on a supercharged ICE, the intake air pressure drop inside the vortex tube robs the ICE of the pressure boost provided by the supercharger and wastes much of the supercharger output into vortex tube hot flow. Similarly, when used on a naturally aspirated ICE, the vortex tube impedes intake air flow thereby reducing the intake air pressure. In both cases the benefit of providing a cooler air to the ICE is accomplished at the expense of reducing the intake air pressure. In particular, data of some vortex tube manufacturers suggests that the pressure ratio between vortex tube inlet port and its cold outlet port should be at least 1.4. Since cooling of the intake air and reducing its pressure have opposite effects on air density, the net benefit of Lindberg's apparatus, if any, is rather limited.

Holman et al. in the U.S. Pat. No. 6,895,752 discloses a turbocharged ICE with an exhaust gas recirculation (EGR) system wherein ICE exhaust is directed to a vortex tube to generate a cooler flow and a hotter flow. The cooler flow is directed to ICE intake to recirculate part of the exhaust gas while the hot flow is exhausted from the ICE in a conventional manner.

In summary, prior art does not teach a supercharged ICE system that is effective during the conditions of high torque and low engine speed, has a fast response, is simple, economical, and can be retrofitted onto existing ICE, does not require exotic electric motors and power supply, avoids exposing electrical components to high temperatures, does not rob engine of power during high power demand, and reduces susceptibility to charge pre-ignition. Furthermore, the prior art does not teach an ICE where intake air is mixed with cold air from a vortex tube. Moreover, prior art does not teach an ICE supercharged by an ejector pump operated by a cold air generated by a vortex tube. It is against this background that the significant improvements and advancements of the present invention have taken place.

SUMMARY OF THE INVENTION

The present invention provides a supercharged ICE system wherein the supercharger assembly comprises a vortex tube operated by high-pressure air that supplies cold, dense air to ICE combustion chamber. Intake of dense air increases the weight of ICE charge and thus enables increase of ICE output power. The supercharger assembly may also include an ejector pump operated by cold air from the vortex tube. The ejector pumps intake air thereby increasing its density both by compression and by cooling. The vortex tube is preferably adapted for generation of cold output stream only. Such a vortex tube may include a cooling jacket or a heat exchanger which transfers heat from the vortex tube to either liquid or gas coolant, or to a phase change material (PCM). The supercharged ICE system may further include means for regulating the flow and/or pressure of high-pressure air fed to the vortex tube and thereby regulating the supercharging action. In addition, the supercharged ICE system may include means for sensing ICE power demand and appropriately controlling the operation of the vortex tube and of the ejector pump (if used) to supercharge the ICE in response to demand.

In a first embodiment of the present invention a vortex tube operated by high-pressure air discharges cold air stream into ICE intake passage. Cold air from the vortex tube may be mixed with intake air from other sources such as ambient air, engine-driven supercharger, exhaust gas turbocharger, or electric turbocharger. The resulting intake air mixture is colder and denser. Flow of intake air from other sources may be regulated by a valve. The supercharged ICE system of the subject invention may also include a compressor and an air tank for providing high-pressure air to the vortex tube. The compressor may be driven by the ICE output shaft, vehicle drive train, an electric motor, or by other suitable means. A variant of the invention includes a vortex tube having a cooling jacket filled with PCM. During a supercharging event, heat generated inside the vortex tube is rejected into the PCM. Between supercharging events, heat is removed from the PCM and transferred to liquid coolant or air. In a second embodiment of the present invention a vortex tube operated by high-pressure air provides compressed cold air to one or more ejector driving nozzles. High-velocity flow produced by the driving nozzle entrains intake air from other intake air sources and pumps it into ICE intake. The driving nozzle may be subsonic, sonic, or supersonic. Furthermore, the driving nozzle may also include lobes to enhance mixing. In a third embodiment of the present invention a vortex tube operated by high-pressure air provides compressed cold air to a supersonic ejector which pumps air into ICE intake. The ejector pump may have one or more supersonic driving nozzles and a shaped diffuser for improved compression of intake air. A bypass duct may be provided for by-passing the ejector pump and thus reducing impedance to intake air flow when the ejector is not operating. Another variant of the invention may use a variable area nozzle to regulate nozzle mass flow rate and/or to vary the output pressure in the vortex tube.

Accordingly, it is an object of the present invention to provide a supercharged ICE system which may generate a high volume intake air flow at high pressure during the conditions of high torque demand and relatively low engine speeds. Low engine speed is hereby defined as being within the lower one third (⅓) of the engine speed range. Thus, if the ICE safe operating speed range is 0 to 6,000 revolutions per minute (rpm), the low engine speed range is 0 to 2,000 rpm. The supercharged ICE system of the present invention is simple, lightweight, and inexpensive to manufacture which makes it suitable for large volume production of automotive vehicles.

It is another object of the invention to provide a supercharger assembly that has a fast response to demand conditions.

It is yet another object of the invention to provide a supercharger assembly that is compact and easily integrable into an ICE system.

It is yet another object of the invention to provide a supercharger assembly that is simple, robust, economical, and has a low component count.

It is yet another object of the invention to provide a supercharger assembly that can be easily retrofitted onto existing ICE.

It is still another object of the invention to cool ICE intake air compressed by a turbocharger or an engine driven supercharger.

It is still another object of the invention to obtain more power from a small displacement ICE and thus providing automotive vehicle equipped with such an ICE with sufficient acceleration in addition to good fuel economy.

It is a further object of the invention to provide a booster stage for a conventional supercharger (engine-driven supercharger or exhaust gas turbocharger) and thus improve ICE performance at low rpm while also reducing response time.

It is still further object of the invention to provide a supercharger that can be used with hybrid vehicles to boost the power of the ICE and thus giving the hybrid vehicle more power to accelerate and ascend grade.

These and other objects of the present invention will become apparent upon a reading of the following specification and claims.

DETAILED DESCRIPTION OF THE PREFERRED EMBODIMENTS

Selected embodiments of the present invention will now be explained with reference to drawings. It will be apparent to those skilled in the art from this disclosure that the following descriptions of the embodiments of the present invention are merely exemplary in nature and are in no way intended to limit the invention, its application, or uses.

Figure 3:
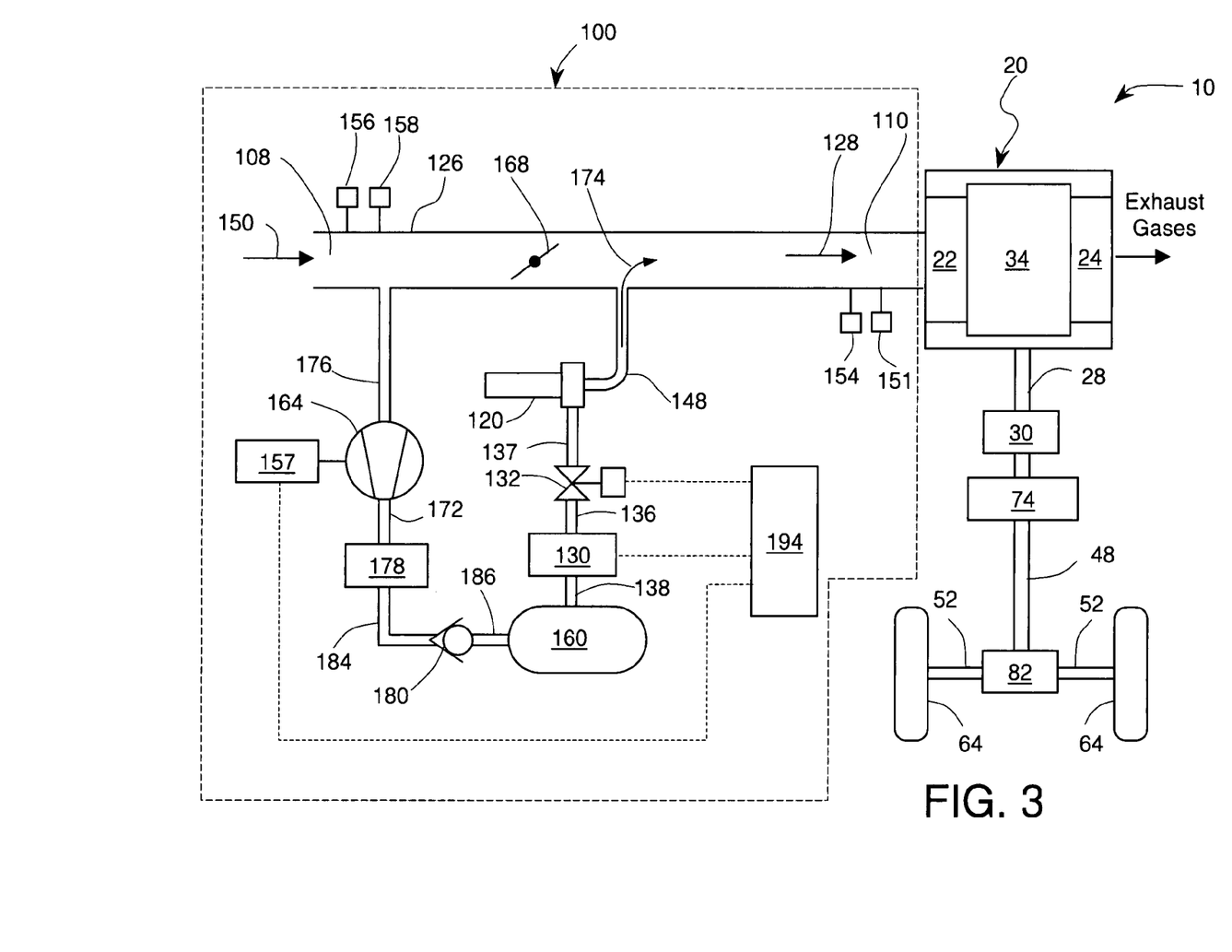
FIG. 3 is a schematic view of a supercharged ICE system in accordance with a first embodiment of the subject invention.

Referring to FIG. 3, there is shown a supercharged internal combustion engine (ICE) system 10 in accordance with a first embodiment of the subject invention. The ICE system 10 comprises an ICE 20 and a supercharger assembly 100. The ICE 20 has at least one combustion chamber 34 fluidly coupled to an intake passage 22 and to an exhaust passage 24. The type of ICE 20 can be either a compression ignition (diesel), a fuel injected spark ignition, carbureted spark ignition, or homogeneous charge compression ignition (HCCI) also known as controlled auto-ignition (CAI). Furthermore, the ICE 20 may also include an output shaft 28 and a torque sensor 30 for sensing ICE output torque. When the ICE system 10 is installed in an automotive vehicle, the output shaft 28 may provide power to a transmission 74, which in turn, may spin a drive shaft 48 to operate vehicle wheels 64 via differential 82 and axle 52 as is commonly practiced in the art. The supercharger assembly 100 comprises an intake duct 126, a vortex tube 120, a high-pressure air supply line 138, control valve 132, pressure regulator 130, interconnecting lines 136 and 137, and air feed line 148. In addition, the supercharger assembly 100 may also include a compressor 164, compressor inlet line 176, aftercooler 178, check valve 180, air tank 160, and interconnecting lines 172, 184, and 186.

The intake duct 126 has an upstream end 108 fluidly connected to a source of intake air and a downstream end 110 fluidly connected to the intake passage 22. Suitable sources of intake air include 1) atmospheric air which may be provided at near ambient pressure and 2) output air from a supercharger (such as engine-driven supercharger, exhaust gas turbocharger, or an electric turbocharger) which may be preferably provided at a pressure higher than ambient atmospheric pressure. The upstream end 108 may be equipped with a pressure sensor 156 and a temperature sensor 158. The downstream end 110 may be equipped with a pressure sensor 154 and a temperature sensor 151. The intake duct 126 may also include a valve 168 to regulate air flow therethrough. The valve 168 may be installed upstream of the location where the air feed line 148 is fluidly connected to the intake air duct 126. Suitable valve 168 includes an automatic check valve permitting a intake air flow from the upstream end 108 to the downstream end 110 of duct 126 but restricting the flow in the opposite direction. An example of such an automatic check valve may be a flapper style check valve. Another suitable valve 168 may be an actuated butterfly valve which, in an open position offers low impedance to flow. A suitable actuator may be a stepping motor which allows precise control over valve position.

The compressor 164 can be of any suitable type including piston, vane, scroll, diaphragm, and screw type (also known as Lysholm) and it may have one or more stages to obtain a desired level of compression. Suction port of the compressor 164 is fluidly coupled by the inlet line 176 to the intake duct 126 and it is adapted for drawing a portion of intake air therefrom. The compressor 164 is preferably driven mechanically, hydraulically or by other suitable means from the output shaft 28 of the ICE 20 or from the vehicle drive shaft 48. Suitable mechanical means may include 1) direct coupling and 2) a system of belt and pulleys. Suitable mechanical means may comprise a clutch 157 that allows engaging the compressor 164 in accordance with predetermined conditions as it will be described below. Clutch 157 may be controlled mechanically, electrically, pneumatically, hydraulically, or by other suitable means. Alternatively, the compressor 164 may be driven by an electric motor. Discharge port of the compressor 164 is fluidly coupled to the air tank 160 via the aftercooler 178, check valve 180 and interconnecting lines 172, 184 and 186.

The aftercooler 178 may be of the same general type used in conventional compressed air systems to remove the heat of compression from the air downstream of a compressor. The aftercooler 178 may be cooled by ambient air or by ICE coolant or other suitable means. The check valve 180 prevents a backflow of high-pressure air from the air tank 160 into the compressor 164 when the compressor is not operating. Line 184 may also include a water separator to remove water condensate from cooled air flow. The design and choice of materials for the air tank 160 are preferably selected to reduce the likelihood of tank rupture in case of vehicle collision and/or fire. In this respect a plurality of smaller interconnected tanks may be preferable to a single large tank. The air tank 160 may also include a vent closed with a plug made of fusible metal which, in the event of fire, may melt and safely relieve the air pressure inside, thereby forestalling an explosion. The air tank 160 may also include a pressure sensor which may be used to determine the amount of air stored. This information may be used to control the operation of the supercharger assembly 100 and can be also made available to the operator of the automotive vehicle. In addition, the air tank 160 may contain an automatic drain valve for automatic expulsion of water condensate that has formed inside the tank.

The pressure regulator 130 is fluidly connected to the air tank 160 by means of the high-pressure line 138. Preferably, the pressure regulator 130 is remotely controllable in a manner that allows remotely controlling the pressure level in line 137. Suitable pressure regulators that are remotely controllable either electrically, pneumatically, hydraulically, or mechanically have been disclosed in prior art and are available commercially. The control valve 132 is fluidly connected to the pressure regulator 130 by means of line 136 and to the inlet port of vortex tube 120 by means of line 137. The control valve 132 may be of on/off type preferably having a very low flow impedance. Alternatively, the control valve 132 may be adapted for substantially smooth regulation of flow of high-pressure air in which case the pressure regulator 130 may become unnecessary.

The vortex tube 120 is preferably of the type adapted for generation of cold air only such as shown in FIGS. 2A and 2B and described in connection therewith. The vortex tube 120 may have a cooling jacket (see FIGS. 2A and 2B) which may be cooled by ICE coolant, or by ambient air, or by other suitable means. If ICE coolant is used, it is preferably supplied at a temperature between 5 and 50 degrees Centigrade. Preferably, the body of the vortex tube 120 is maintained at a temperature above zero degrees Centigrade to prevent moisture contained in the air entering the tube from freezing onto tube walls. The design of vortex tube 120 may also include a provision to reduce susceptibility to plugging by ice formed from the residual moisture in the inlet air. Suitable non-freezing vortex tube has been disclosed by Tunkel at al. in U.S. Pat. No. 6,289,679. As already described, the inlet port of vortex tube 120 is fluidly connected to the air tank 160 via pressure regulator 130, valve 132, and interconnecting lines 136, 137, and 138. The cold outlet port of vortex tube 120 is fluidly connected by the air feed line 148 to the intake duct 126. An alternative vortex tube for use with the subject invention may have a conventional design for concurrent generation of hot and cold outlet stream such as shown in FIG. 1 and described in connection therewith. In this case the hot outlet stream may be released from the vortex tube through an appropriate flow impeding device (such as a control valve) so that the cold and hot outlet streams are desirably balanced in volume and a desired cold stream temperature is obtained. Regardless of the type of vortex tube use, one or more vortex tubes may be used in parallel. An engine throttle, if used, may be located in the intake duct 126 preferably downstream of line 148.

The ICE system 10 preferably includes an electronic control unit (ECU) 194. Suitable ECU may be comprised of a central processing unit, a read-only memory, random access memory, input and output ports, and the like. The ECU 194 may be configured to receive signals from sensors in the ICE system 10, to determine whether certain predetermined conditions exist based on the measured parameters.

During normal operation of the supercharged ICE system 10, the compressor 164 is caused to maintain air pressure in tank 160 within predetermined limits. In particular, the compressor 164 draws air (preferably free of dust and solid particulates) from the intake duct 126 through the inlet line 176 and compresses it to a desired pressure. Preferred compressor output pressure is between 100 and 300 psi. As an alternative, the compressor 164 may draw filtered air from ambient atmosphere. Output of the compressor 164 is fed through line 172 into the aftercooler 178 where the heat of compression is largely removed, and through line 184, check valve 180 and line 186 into the tank 160. The air tank 160 may be equipped with a pressure switch having one higher setting and one lower setting. The pressure switch may be wired to the controls of the compressor 164 (and/or to the clutch 157, if used) so that the compressor 164 maintains the pressure in the air tank 160 between predetermined limits. Alternatively, the compressor 164 may be equipped with an unloader valve which automatically relieves the compressor of the pumping load when air tank 160 is charged to a predetermined pressure. Preferably, the compressor 164 is engaged in a smooth and/or gradual manner to avoid imposing abrupt load on its source of motive power. In particular, to avoid excessive power drain on the ICE or the vehicle power train, operation of the compressor may be prohibited or restricted during periods of high power demand. Alternatively, operation of the compressor may be allowed only when the ICE output torque is less than a predetermined ICE output torque value. As a yet another alternative, operation of the compressor may be allowed only when the torque in vehicle drive shaft 48 is less than a predetermined vehicle drive shaft torque value.

When the ICE 20 operates without the aid of the supercharger 100, the control valve 132 is closed. Intake air stream 150 preferably free of dust and solid particulates enters the upstream end 108 of intake duct 126 and exits through the downstream end 110 into the intake passage 22 of ICE 10 without a significant temperature change. The compressor 164 may be operated concurrently, as necessary to maintain pressure inside the tank 160 within predetermined limits.

When the ICE 20 operates with the aid of the supercharger 100, the pressure regulator 130 regulates high-pressure air it receives from the high-pressure supply line 138 and flows regulated high-pressure air at a predetermined pressure $p_1$ into line 136. Valve 132 and lines 136, 137, and 148 are preferably constructed to have a very low impedance to air flow. Preferably, the output pressure of pressure regulator 130 is set so that the pressure $p_1$ at the vortex tube inlet is at least 40% greater than the pressure $p_2$ inside the intake duct 126 at the junction with line 148. A preferred value for pressure ratio of $p_1/p_2$ is between about 1.4 and about 8. Prior art suggests that exceeding this range may cause undesirable pressure shocks inside the vortex tube 120 (see, e.g., B. K. Ahlbom, supra). The control valve 132 is in an open position and allows the high-pressure air to flow through the line 137 to the inlet port of the vortex tube 120. If the vortex tube shown in either FIG. 2A or 2B is used, thermodynamic action inside the vortex tube deposits heat into the tube's cooling jacket and it cools the air inside the tube. Cold air exits the vortex tube 120 through the cold outlet port and it forms a stream 174 which flows through the air feed line 148 into the intake duct 126. If the valve 168 is not installed, or if it is installed and at least partially open, the cold air stream 174 from the vortex tube is mixed with the intake air stream 150 to form an engine feed stream 128. The stream 128 has a temperature lower than the intake air stream 150 and, therefore, higher density than the intake air stream 150. This means that injection of the cold air stream 174 into the intake duct 126 enables the ICE to produce more power. Such a potential for producing more power be utilized by concurrently increasing the fuel flow rate to an appropriate level. If the valve 168 is installed in the intake duct 126, it may be used to regulate the flow of the intake air stream 150. For example, the valve 168 may be in a closed position while the cold air stream 174 is injected into the duct 126. In this case, all of the intake air for the ICE is provided by the vortex tube 120. Since the valve 168 is closed, the output flow of the vortex tube may be increased to boost the pressure in the intake passage 22 to a level beyond what may be possible with the valve 168 in an open position (or with the valve 168 not installed). This may yield a double benefit of supplying the ICE with cold air and at elevated pressure. If the valve 168 is employed to regulate the intake air flow, the rates of closing and opening the valve are preferably controlled so that the density of intake air in intake passage 22 is varied substantially smoothly and sudden surges or drops in ICE output power are avoided. It should be noted that the intake air stream 150 may originate from intake air sources including ambient atmosphere or a discharge flow from a supercharger. The latter may be an engine driven supercharger, a turbocharger, or electric turbocharger. Injection of cold air stream 174 into an output of such a supercharger may reduce the need for an intercooler which is normally used downstream of a supercharger.

Under typical driving conditions the periods of high-power demand are relatively short and (depending on vehicle driving conditions) may occur on the average only about 10% of the vehicle operating time. This means that the supercharger 100 may operate in an intermittent mode, supercharging the ICE for about 10% of the vehicle operating time. This may leave on the average about 90% of the vehicle operating time available for recharging the supercharger tank 160.

At any time during the ICE operation, the ECU 194 may monitor one or more operating parameters of the ICE system 10 and regulates the mass flow rate of air through the vortex tube 120 by operatively controlling the pressure regulator 130 and the valve 132 according to predetermined conditions. Operating parameters monitored by the ECU may include engine rotational speed, engine output torque, fuel flow rate, vehicle speed, throttle opening, and position of accelerator pedal. Other useful parameters monitored by the ECU may include ambient air pressure and temperature, intake air mass flow rate, intake air pressure and temperature, detection values of pressure sensors 154 and 156, and detection values of temperature sensors 151 and 158. The torque value can be either directly measured (for example, the torque value can be the detection value from the torque sensor 30) or it can be inferred from other ICE parameters. In particular, it is well known that engine torque value can be estimated from one or more ICE parameters including intake air mass flow rate, spark timing, or combustion chamber pressure data as noted, for example, by T. Jaine et al. in "High-Frequency IMEP Estimation and Filtering for Torque-Based SI Engine Controls," SAE paper number 2002-01-1276, published by the Society of Automotive Engineers, Inc., Warrendale, Pa. Alternatively to using an ECU with a central processing unit, various electrical, mechanical, electromechanical, hydraulic, and/or pneumatic control mechanisms may be used to operate the valve 132 and the pressure regulator 130 in response to predetermined conditions. It will be apparent to those skilled in the art from this disclosure that the precise structure and algorithms for the ECU can be any combination of hardware and software that will carry out the functions of the present invention.

There is a variety of processes the ECU 194 may employ for controlling the operation of the supercharger 100. Preferably, the ECU repeatedly executes the control routine 900 represented by the flowchart shown in FIG. 4. After the control routine 900 is started and the ECU obtains detection values of various ICE system sensors to determine ICE state (step 912). Such sensors may include, but are not limited to ICE rotational speed, position of accelerator pedal, throttle opening, fuel flow rate, vehicle speed, ICE output torque, air velocity in the intake duct 126, air pressure in line 137, setting of the pressure regulator 130, position of the control valve 132, detection values of pressure sensors 154 and 156, detection values of temperature sensors 151 and 158, air pressure and temperature in ICE intake passage 22, and ambient air pressure and temperature. Preferably, the ECU calculates the actual ICE power output ($P_A$) and the power output being demanded from the ICE ($P_D$) (step 914). Based on the obtained parameters the ECU may determine whether or not an ICE power deficit exists (step 916). This may be accomplished, for example, by comparing the values of the actual ICE power output $P_A$ and the demanded ICE power output (power demand) $P_D$. A power deficit may be established when, for example, the power demand $P_D$ is greater than the actual ICE power output $P_A$ by more than a predetermined amount x (namely, $P_D - P_A > x$).

Figure 4:
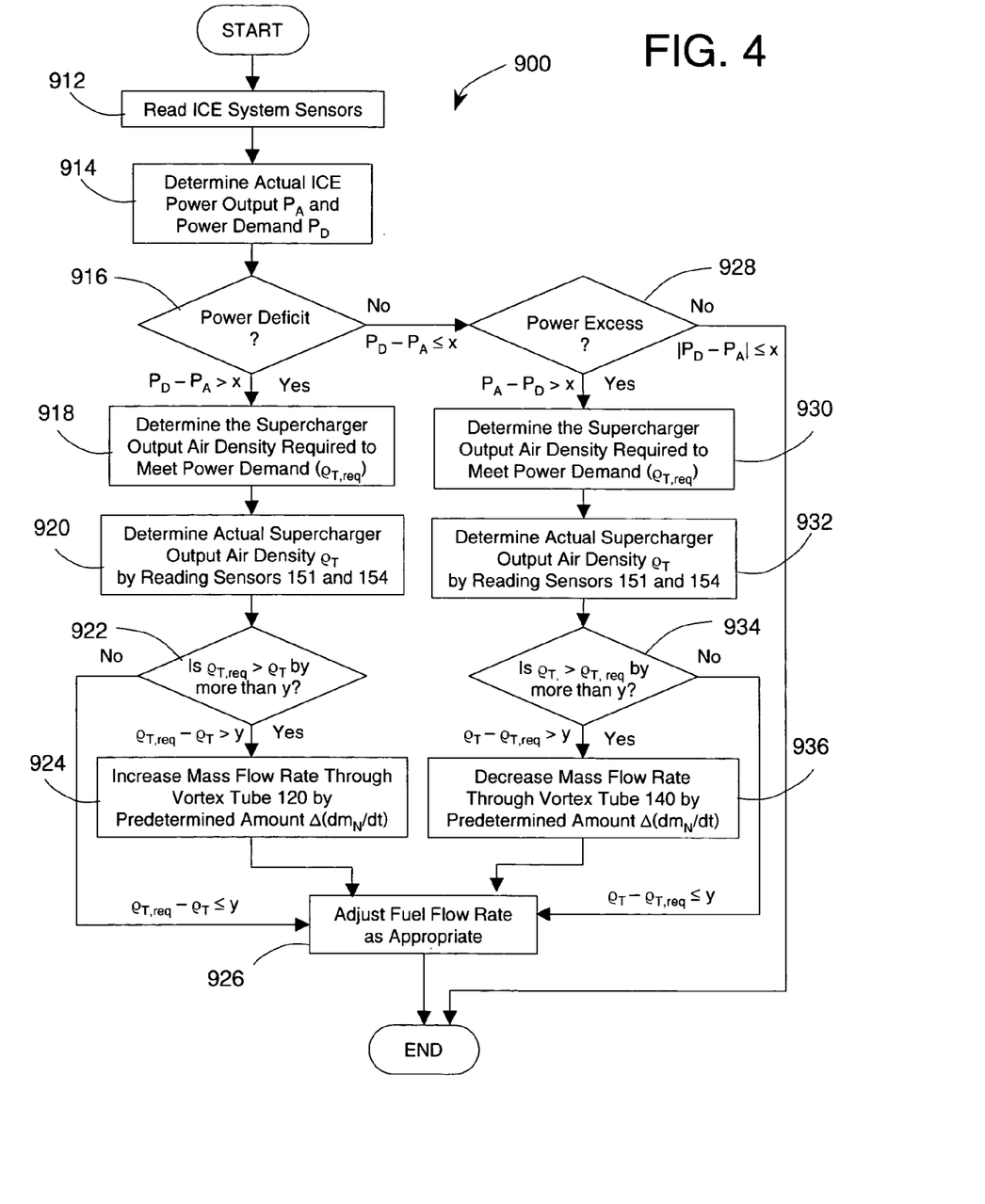
FIG. 4 is a flow chart showing preferred control routine for operations of an electronic control unit.

If a power deficit exists, the ECU may then calculate the air density ($\rho_{T,req}$) at the downstream end 110 of the intake duct 126 (supercharger output air density) required to meet the power demand at optimum throttle opening (if throttle is used) and air-fuel ratio (step 918). If the ICE has an electronically controlled throttle, an optional next step (not shown) can include opening of the throttle by a predetermined amount. The ECU then obtains actual intake air density measurement ($\rho_T$) by obtaining the detection value of the pressure sensor 154 and temperature sensor 151 (step 920). The values of the required air density $\rho_{T,req}$ and the actual air density $\rho_T$ are then compared (step 922). If the required density value $\rho_{T,req}$ is greater than the actual density value $\rho_T$ by more than a predetermined amount y (namely, $\rho_{T,req} - \rho_T > y$), the ECU increases the air mass flow rate $dm_N/dt$ through the vortex tube 120 by a predetermined incremental amount $\Delta(dm_N/dt)$ (step 924). This may be accomplished by increasing the output pressure of pressure regulator 130 with the valve 132 in open position. The value of incremental amount $\Delta(dm_N/dt)$ may be made generally proportional to the difference between the required and actual air densities at the downstream end 110 of the intake duct 126 (namely, $\Delta(dm_N/dt) \propto \rho_{T,req} - \rho_T$). If desired, the incremental amount $\Delta(dm_N/dt)$ can be appropriately limited not to exceed a predetermined value, and such a value can be updated each time the routine of FIG. 4 is executed. This approach can be used to avoid abrupt changes in supercharger output pressure and consequential surge in ICE output. Preferably, an increase in the supercharging action is performed so that ICE power is increased in a smooth fashion and with prompt response to demand. To assure proper air-fuel ratio, ECU may adjust fuel flow rate as appropriate to improve ICE performance (step 926) and the routine is ended. If the required density value $\rho_{T,req}$ is not greater than the actual density value $\rho_T$ by more than a predetermined amount y (namely, $\rho_{T,req} - \rho_T \leq y$) (step 922), no change to the supercharger condition is required. Then the ECU may adjust fuel flow rate as appropriate for improved ICE performance (step 926) and the routine is ended.

If the ECU determines that a power deficit does not exist (step 916), the ECU then evaluates whether a power excess exists (step 928). A power excess is established when, for example, the demand power output $P_D$ is smaller than the actual ICE power output $P_A$ by more than a predetermined amount x (namely, $P_A - P_D > x$). If a power excess exists, the ECU may then calculate the air density $\rho_{T,req}$ at the downstream end 110 of the intake duct 126 required to meet the power demand at optimum throttle opening (if throttle is used) and air-fuel ratio (step 930). If the ICE has an electronically controlled throttle, an optional next step (not shown) can include closing of the throttle by a predetermined amount. The ECU then obtains actual supercharger output air density measurement $\rho_T$ by obtaining the detection values of the pressure sensor 154 and temperature sensor 151 (step 932). The values of the required pressure $\rho_{T,req}$ and the actual air density $\rho_T$ at the downstream end 110 of the intake duct 126 are then compared (step 934). If the required density value $\rho_{T,req}$ is smaller than the actual density value $\rho_T$ by more than a predetermined amount y (namely, $\rho_T - \rho_{T,req} > y$), the ECU may decrease the mass flow rate $dm_N/dt$ through vortex tube 120 by a predetermined incremental amount $\Delta(dm_N/dt)$ (step 936). This may be accomplished by decreasing the output pressure of the pressure regulator 130 with the valve 132 in an open position or by closing the valve 132. The value of incremental amount $\Delta(dm_N/dt)$ can be made generally proportional to the difference between the actual and the required densities in the intake duct 126, namely $\Delta(dm_N/dt) \propto (\rho_T - \rho \rho_{T,req})$. If desired, the incremental amount $\Delta(dm_N/dt)$ can be appropriately limited not to exceed a predetermined value which can be updated each time the control routine 900 is executed. This approach may be used to avoid abrupt changes in air density in the intake passage 22 and the consequential abrupt change in the ICE output. Preferably, a reduction in supercharging action is performed so that ICE power is decreased in a smooth fashion and with prompt response to demand. To assure proper air-fuel ratio, ECU can adjust fuel flow rate as appropriate to improve ICE performance (step 926) and the routine is ended. If the actual air density value $\rho_T$ is not greater than the required air density value $\rho_{T,req}$ in the transition duct by more than a predetermined amount y (namely, $\rho_T - \rho_{T,req} \leq y$) (step 922), no change to the supercharger condition is required. Then, the ECU can adjust fuel flow rate as appropriate for improved ICE performance (step 926) and the routine is ended.

If the routine step 928 establishes that value of $P_D - P_A$ is less than or equal to predetermined value x, it means that the absolute value of $P_D - P_A$ is less than or equal to predetermined value x (namely, $|P_D - P_A| \leq x$). In such a case, neither power deficit or power excess exist and the routine is ended. This conditions may correspond to an automotive vehicle cruising on level road or an ICE operating in idle. To assure that ICE system 10 promptly responds to demand, the control routine 900 may be executed at a rapid repetition rate, preferably 10 to 100 times per second.

Alternative control routine responding to torque demand rather than power demand may be also implemented. Such a routine may be identical to the routine 900 except that in steps 914, 916, and 928, the term "power" is replaced with the term "torque". Suitable methods for determining demand torque value are known in the art and include determination of demand torque from position of vehicle acceleration pedal. See, for example, N. Heintz et al., in "An Approach to Torque-Based Engine Management Systems," SAE paper number 2001-01-0269, published by the already noted Society of Automotive Engineers. Another alternative control routine may be used if the ICE system 10 has means for measuring intake air mass flow. Such a routine may be identical to the routine 900 except that in steps 918, 920, 922, 930, 932 and 934, the terms "$\rho_{T,req}$" and "$\rho_T$" are replaced respectively with the terms "$dm_{T,req}/dt$" and "$dm_T/dt$" where $dm_{T,req}/dt$ is the mass flow of air required to meet ICE output demand and $dm_T/dt$ is the actual mass flow of air measured flowing through the transition duct 124. Another variant of the control routine 900 may omit steps 918, 920, 922, 930, 932, and 934.

Alternative criteria for establishing power deficit and power excess conditions include: 1) Power deficit condition is established when engine rotational speed is less than predetermined engine rotational speed value and engine output torque is more than a predetermined engine output torque value. Accordingly, power excess condition is established when engine rotational speed is more than predetermined engine rotational speed value and engine output torque is less than a predetermined engine output torque value. 2) Power deficit condition is established when engine rotational speed is less than predetermined engine rotational speed value and engine fuel flow rate is more than a predetermined fuel flow rate value. Accordingly, power excess condition is established when engine rotational speed is more than predetermined engine rotational speed value and engine fuel flow rate is less than a predetermined fuel flow rate value. 3) Power deficit condition is established when the actual engine torque (measured or inferred) value is less than the demand torque value calculated from the position of accelerator pedal. Accordingly, power excess condition is established when the actual engine torque (measured or inferred) value is more than the demand torque value calculated from the position of accelerator pedal.

Figure 5:
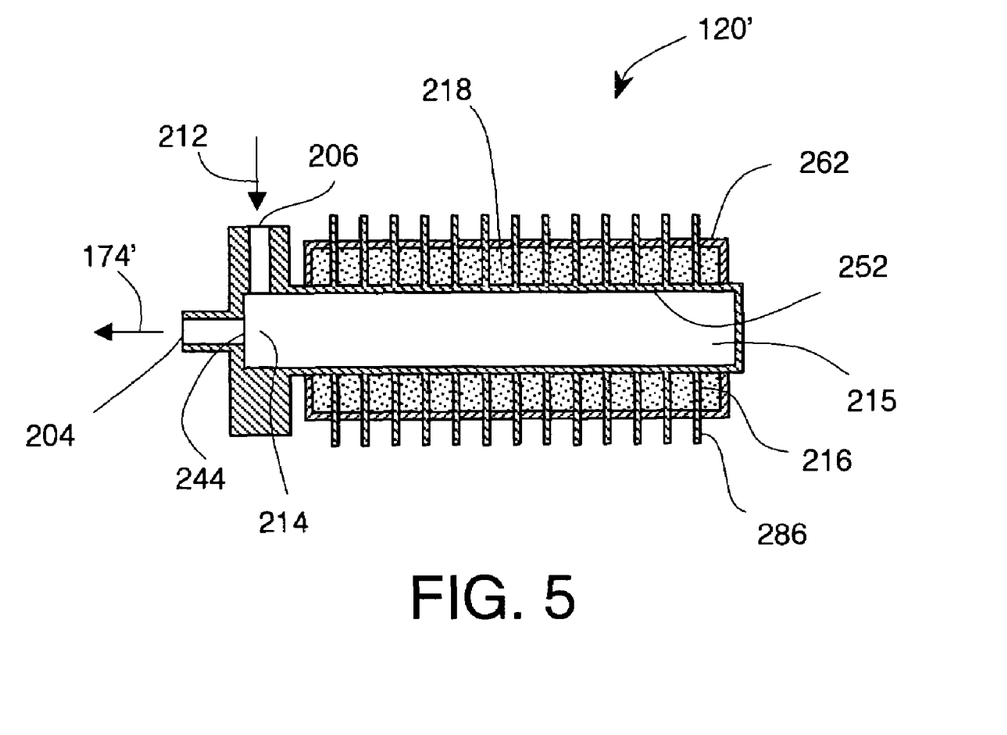
FIG. 5 is a cross-sectional view of a vortex tube adapted for generation of cold output stream only while rejecting heat into a phase change material (PCM).

FIG. 5 shows an alternative vortex tube 120' suitable for use with the subject invention. The vortex tube 120' comprises a tubular body 252 having two ends 214 and 215 opposite to each other. The first end 215 is entirely closed. The second end 214 is partially closed and has a central opening 244 leading to a cold outlet port 204. An inlet port 206 for high-pressure air is installed in proximity of the second end 214. The tubular body 252 is preferably constructed from a material with high thermal conductivity such as copper, copper alloys, aluminum and aluminum alloys. Exterior of the tubular body 252 is substantially surrounded by a cooling jacket 262 filled with phase change material (PCM) 218. Suitable PCM may include stearin which is known to have a transition temperature in the range of 50-70 degrees Centigrade and certain fusible metals such as Wood's metal which is known to have a transition temperature around 70 degrees Centigrade or Field's metal which is known to have a transition temperature around 62 degrees Centigrade. The vortex tube 120' may also include cooling fins 216 attached to the exterior surface of tubular body 252. Suitable cooling fins are preferably made of material with high thermal conductivity and are in a good thermal contact with each the tubular body 252 and the PCM 218. In one embodiment, the cooling fins 216 may extend radially and protrude through the cooling jacket 262 (FIG. 5). Tip portions 286 of cooling fins 216 may be in a thermal communication with a cooling fluid which may be a gas such as air or a liquid such as engine cooling fluid.

The vortex tube 120' is suitable for operation in two modes: 1) a cooling mode and 2) a thermal recovery mode. At the beginning of the cooling mode, the PCM 218 is substantially in a solid form. High-pressure air stream 212 at an initial pressure and temperature is injected through the inlet port 206 tangentially into the interior of the tubular body 252 where it forms a vortex flow pattern in a manner already described in context with FIGS. 1, 2A and 2B. Furthermore, the air is cooled and it forms a cold air stream 174' having reduced temperature and pressure. The cold air stream 174' exits the vortex tube 120' through the central opening 244 and the cold outlet port 204. The vortex flow deposits heat into the tubular body 252. The tubular body 252 further conducts the heat with the aid of the cooling fins 216 into the PCM 218 and causes it to gradually melt. When the PCM 218 is substantially melted, the cooling mode may be terminated, the flow of high-pressure air stream 212 is stopped, and the thermal recovery mode may be initiated. In the thermal recovery mode of operation, heat stored in the PCM 218 may be removed from the vortex tube 120' by conducting it through the cooling fins 216 to a coolant in thermal communication with the tip portions 286. When the PCM 218 has been substantially transformed back into a solid form, the thermal recovery mode of operation may be concluded and the vortex tube 120' may be ready for operation in the cooling mode.

Figure 6:
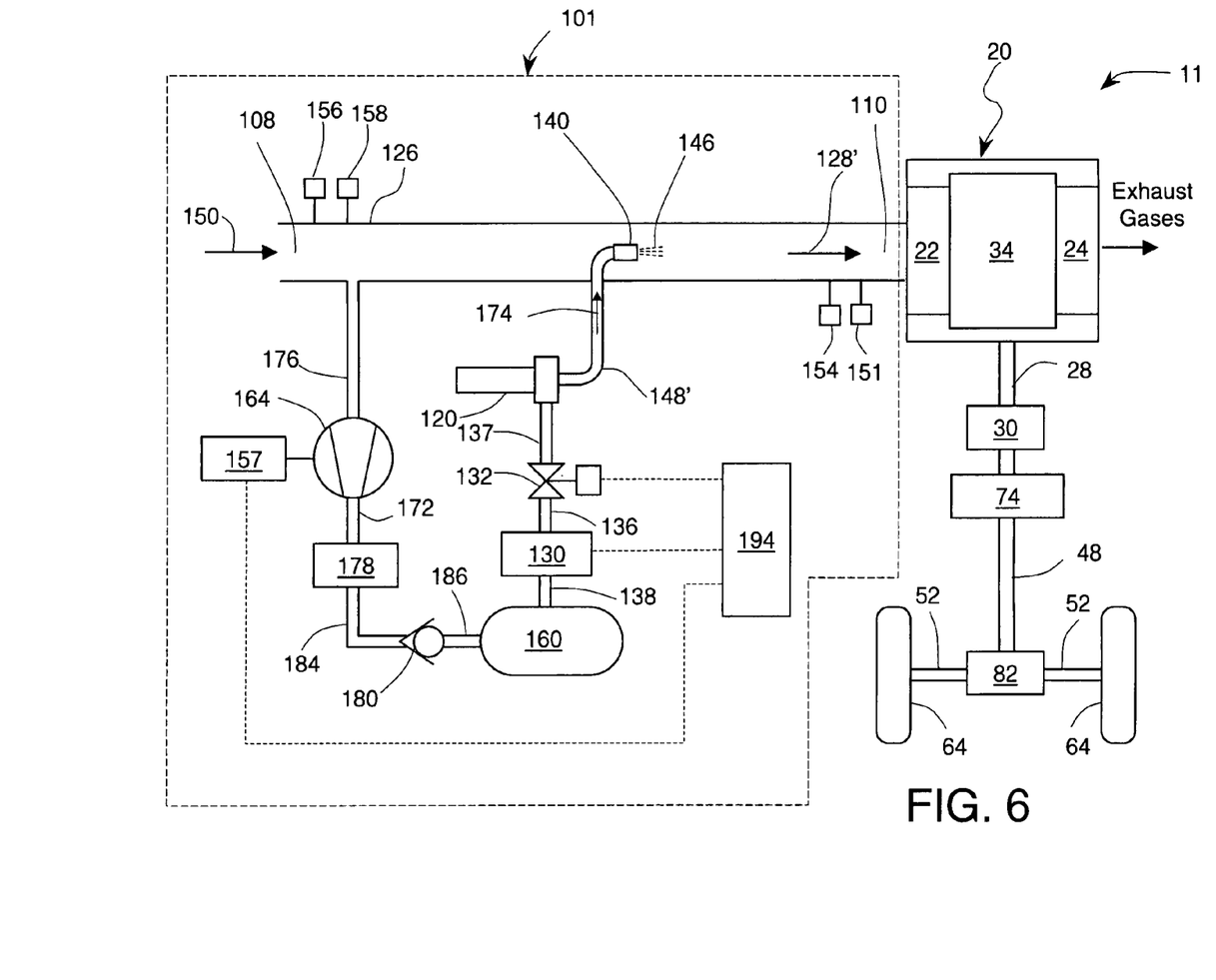
FIG. 6 is a schematic view of a supercharged ICE system in accordance with a second embodiment of the subject invention.

Referring now to FIG. 6, there is shown a supercharged ICE system 11 in accordance with a second embodiment of the subject invention and having enhanced capability to provide dense air to the ICE 20. The ICE system 11 comprises a supercharger assembly 101 which is essentially the same as the supercharger assembly 100 except that the cold output port of the vortex tube 120 is connected to the feed line 148' which is terminated with a driving nozzle 140. Furthermore, valve 168 may be omitted. The nozzle 140 is further oriented toward the downstream end 110 of the duct 126. The purpose of the nozzle is to direct cold air generated by the vortex tube 120 generally in the direction of the downstream end 110 of the intake duct 126. One driving nozzle or several nozzles working in parallel may be used. Suitable nozzle types include a simple orifice, a subsonic nozzle, a sonic nozzle, supersonic nozzle, converging-diverging nozzle, and a lobed nozzle. Preferred nozzle types include a converging-diverging nozzle which is conducive to generating supersonic flow and/or a lobed nozzle which is known for its good mixing characteristics. Lobed nozzles are known to have improved characteristics for mixing of the surrounding air with the high velocity jet the produce. Lobed nozzles may be operated either in a subsonic or supersonic regime. Suitable multi-lobed nozzle is described in a variety of technical publications including, for example, in "Parameter Effects on Mixer-Ejector Pumping Performance" by S. A. Skebe et al., paper number AIAA-88-0188 and in "Short Efficient Ejector Systems" by W. Pretz, Jr. et al., paper number AIAA-87-1837, both of which are available from the American Institute of Aeronautics and Astronautics, Washington, D.C., and in "Supersonic Nozzle Mixer Ejector," by T. G. Tillman et al. published in Journal of Propulsion and Power, Volume 8, Number 2, March-April 1992, pages 513-519, and "Supersonic-Ejector Characteristics Using Petal Nozzle," by A. K. Narayanan et al., published in Journal of Propulsion and Power, Volume 10, Number 5, Sept.-Oct. 1994, pages 742-744.

When the ICE 20 is supercharged by the supercharger assembly 101, high-pressure air flows from the tank 160 through the high-pressure supply line 138, pressure regulator 130, line 136, control valve 132 and line 137 to the vortex tube 120 where the air is cooled in an already described manner to produce the cold air stream 174. The cold air stream 174 is transported through the air feed line 148' to the driving nozzle 140 and it emerges therefrom as a high-velocity jet 146. Concurrently, intake air stream 150 preferably free of dust and particulates enters the upstream end 108 of duct 126, it is entrained by the high-velocity jet 146 and it is swept by the jet towards the downstream end 110 of duct 126 thereby producing a mixed engine feed stream 128'. Kinetic energy of the flow downstream of the nozzle 140 is gradually converted into a potential (pressure) energy. As a result, air pressure at the downstream end 110 of duct 126 is greater than at the upstream end 108 and the air temperature at the at the downstream end 110 is lower than at the upstream end 108. This means that the air density of the engine feed stream 128' is significantly greater than the density of the intake air stream 150. A portion of the intake duct 126 downstream of the nozzle 140 may be formed to diverge in the direction of the flow. Such an arrangement is known to decelerate subsonic flow and promote conversion of kinetic energy of the flow to pressure. It should be noted that the nozzle 140 together with the intake duct 126 may be regarded as an ejector.

Excessively turbulent intake air may compromise proper operation of devices such as throttle, fuel injector, and carburetor which may be located downstream of the nozzle 140. Turbulence in the engine feed stream 128' may be reduced by installing a turbulence reducing device in the downstream end 110 of intake duct 126. Suitable turbulence reducing devices may include one or more screens or perforated plates installed generally perpendicular to the direction of bulk flow. Alternative suitable turbulence device may be an array of parallel flow channels such as disclosed in Applicant's co-pending U.S. application Ser. No. 11/389,795 filed on Mar. 27, 2006, the entire contents of which is hereby expressly incorporated by reference.

Figure 7:
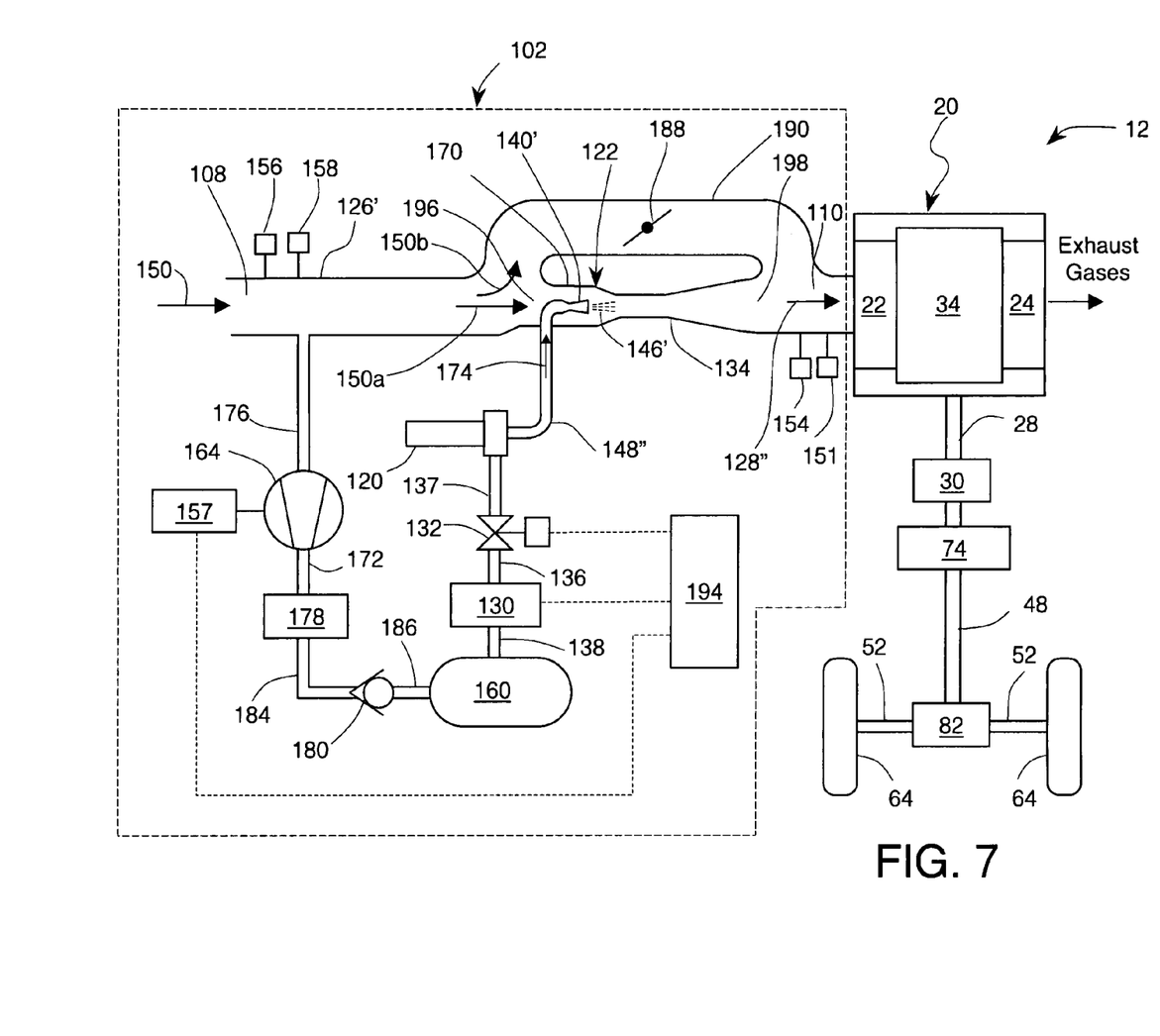
FIG. 7 is a schematic view of a supercharged ICE system in accordance with a third embodiment of the subject invention.

Referring now to FIG. 7, there is shown a supercharged ICE system 12 comprising a supercharger assembly 102 in accordance with a third embodiment of the subject invention having further enhanced capability to provide dense air to the ICE 20. The supercharger assembly 102 is essentially the same as the supercharger assembly 100, except that it further includes an ejector 122 and a bypass duct 190. In addition, the intake duct 126' is a modified version of the intake duct 126 (FIGS. 3 and 6) that allows the intake air stream 150 to flow either as a stream 150a though the ejector pump 122 or as a stream 150b through the bypass duct 190. Furthermore, the bypass duct 190 includes a bypass valve 188 that prevents a back flow through the bypass duct. The ejector pump 122 further includes a driving nozzle 140', a suction chamber 170 having a suction port 196, and a diffuser duct 134 having a discharge port 198. The driving nozzle 140' is fluidly coupled to the cold outlet port of vortex tube 120 by the air feed line 148". The driving nozzle 140' is a supersonic nozzle adapted for generation of supersonic flow. Suitable types of such supersonic nozzles include the convergent-divergent type nozzle also known as the Laval nozzle, annular nozzle (see the already noted Applicant's co-pending U.S. application Ser. No. 11/389,795), plug nozzle, spike nozzle (see, for example, the above noted McGraw-Hill Dictionary of Scientific and Technical Terms), and the expansion-deflection nozzle. The Laval nozzle may be implemented as a 1-dimensional (slit nozzle) or a 2-dimensional ("bell" nozzle). Suitable supersonic nozzle may be also equipped with lobes (see, e.g. lobed nozzle described above) to promote mixing and improve pumping. Ejector pump 122 may be also practiced with multiple driving nozzles injecting high-velocity jet into a single diffuser duct. Alternatively, several ejector pumps 122 may be used in parallel.

The diffuser duct 134 preferably has a circular cross-section which is known for its low wall friction losses. However, other cross-sections including oval, ellipse, square, rectangle, and polygonal shape can be also used. The diffuser duct 134 preferably has an upstream converging section, which is followed by a straight middle section that is followed by a downstream divergent section as shown in FIG. 7. As already noted, such a diffuser duct design is considered conventional for use with ejector pumps. However, the subject invention can be practiced with alternative diffuser designs. For example, an alternative design of the diffuser duct 134 may have only a straight section followed by a divergent section. Another alternative design of the diffuser duct 134 may have only a straight section. The preferred size and shape of the diffuser duct 134 is determined in accordance with a desired performance. The diffuser 134 can be also constructed with a variable area throat as described, for example, in the above noted Applicant's co-pending U.S. application Ser. No. 11/389,795.

The bypass valve 188 may be formed as a check valve that closes automatically whenever the pressure at the downstream end 110 of the intake duct 126' exceeds the pressure at the upstream end 108 of the intake duct 126' by more than a predetermined amount. Alternatively, the bypass valve 188 may an actuated valve of a suitable type (e.g., gate valve, poppet valve, damper valve, or a butterfly valve) operated by the ECU. For example, the ECU may close the bypass valve 188 whenever the mass flow through the driving nozzle 140' exceeds a predetermined mass flow value. Conversely, the ECU may open the bypass valve 188 whenever the mass flow through driving nozzle 140' is below a predetermined mass flow value. If the valve 188 is an actuated valve, its closing and opening rate can be coordinated with the value of mass flow rate of air through nozzle 140' to produce a substantially smooth variation in air density at the ICE intake passage 22. This approach avoids undesirably abrupt changes in supercharger output air density and consequential abrupt changes in ICE power output. Suitably precise control of valve 188 can be accomplished, for example, by actuating the valve 188 by a stepping motor.

During naturally aspirated operation of the ICE 20, the bypass valve 188 is in an open position and the control valve 132 is closed. The ICE draws the intake air stream 150 through the intake duct 126' and through the bypass duct 190 into the ICE intake passage 22. Some portion of the intake air may also flow through the ejector pump 122. When the ICE 20 is supercharged by the supercharger assembly 102, the bypass valve 188 is closed, the control valve 132 is open and the ejector pump 122 is operated. In particular, high-pressure air flows from the tank 160 through the high-pressure supply line 138, pressure regulator 130, line 136, control valve 132 and line 137 to the vortex tube 120 where the air is cooled in an already described manner to produce cold air stream 174. The cold air stream 174 is transported through the air feed line 148" to the nozzle 140' and it emerges therefrom as a high-velocity jet 146'. Concurrently, intake air stream 150 preferably free of dust and particulates enters the upstream end 108 of the duct 126 and it is drawn through the suction port 196 into the suction chamber 170 of the ejector 122. There the intake air stream is entrained by the high-velocity jet 146' and it is swept by the jet into the diffuser 134. The diffuser 134 converts the kinetic energy of the flow downstream of the nozzle 140' into a potential (pressure) energy. The decelerated flow exits the diffuser 134 through the port 198, thereby producing an intake air stream 128. As a result, air pressure at the downstream end 110 of duct 126 is greater than at the upstream end 108 and the air temperature at the at the downstream end 110 is lower than at the upstream end 108. This means that the air density of the engine feed stream 128" is significantly greater than the density of the intake air stream 150, thereby enabling the ICE 20 to produce more power. To operate the nozzle 140' in the supersonic regime, the nozzle pressure ratio (=pressure in line 148"/pressure in suction chamber 170) should be at least 1.9. To assure this condition, the flow rate and pressure of air fed in line 137 into the inlet port of vortex tube 120 should be properly selected so that the pressure ratio of the vortex tube inlet to cold outlet port is maintained between about 1.4 and about 8 as already stated above.

Figure 8:
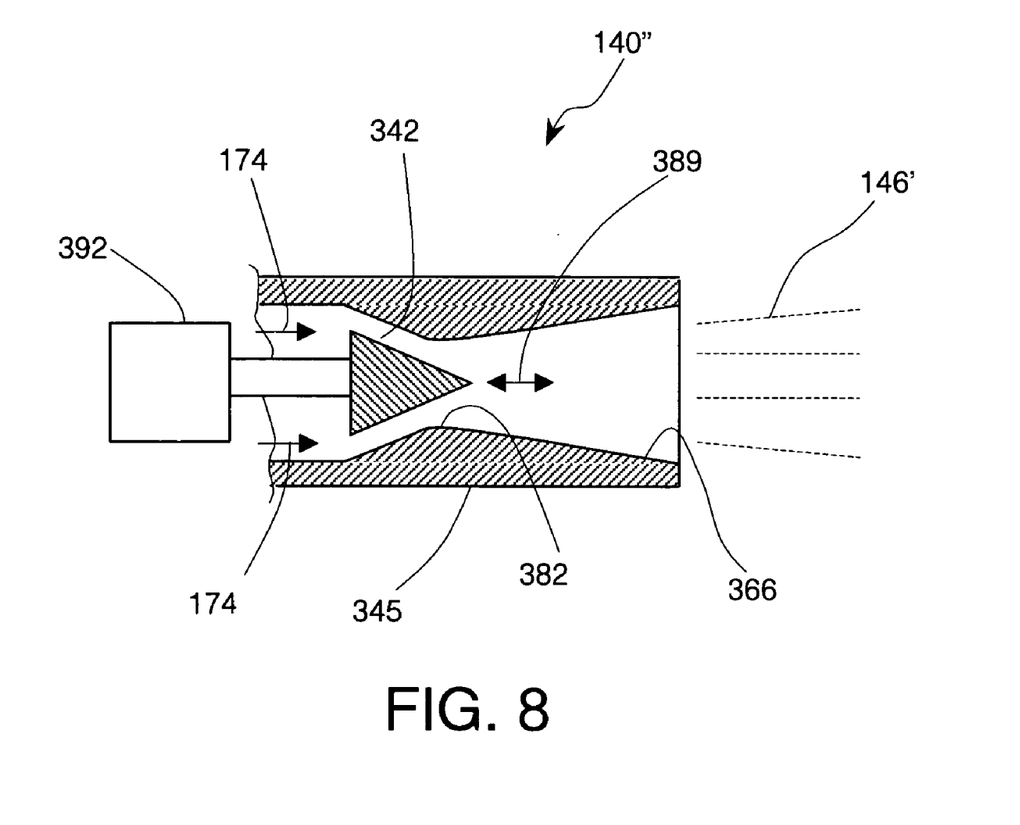
FIG. 8 is a cross-sectional view of a pintle-type variable area nozzle suitable for use with the subject invention.

Nozzles 140 and 140' may be also practiced as variable area nozzles. In such a case the nozzle may be used to control the mass flow rate of air through the vortex tube 120. This approach may be used either to supplement the pressure regulator 130 or to make the pressure regulator unnecessary. An example of a suitable variable area nozzle is disclosed in the already noted Applicant's co-pending U.S. application Ser. No. 11/389,795. Another example of a variable area nozzle suitable for use with the subject invention is a pintle nozzle shown in FIG. 8. Referring now to FIG. 8, there is shown a pintle nozzle 140" comprising a nozzle body 345 and a pintle 342 operated by actuator 392. Nozzle body 345 further includes a throat 382 and a diverging portion 366. Actuator 392 is preferably of a linear type suitable for acting in the directions identified by a double arrow 389 so as to cause precise positioning of the pintle 342 inside the nozzle throat 382. Mass flow through the nozzle may be throttled by moving the pintle 342 to increase or decrease the nozzle throat area. When the nozzle is operated in a supersonic regime, the flow in the throat is choked and has a sonic velocity. The flow downstream the throat is accelerated to supersonic velocities in the diverging portion 366.

It will be appreciated that the present invention can be implemented with a variety of ICE of either reciprocating type or rotary type. The ICE can have any number of combustion chambers. Features of the various embodiments can be combined in any manner. As already noted, the supercharger assembly 100 (and each of its variants 101 and 102) be also used with engine-driven superchargers, exhaust gas turbochargers, and electric turbochargers to augment their performance. One advantage of using the invention in a combination with an engine driven supercharger or a turbocharger is that the performance of the overall ICE system is improved since the supercharger assembly of the subject invention provides improved supercharging performance in conditions of high torque and low engine speeds (e.g., during automotive vehicle acceleration from a stopped condition), whereas the conventional supercharger provides improved supercharging performance in conditions of high torque and high engine speeds, especially when such conditions last for a longer period of time (e.g., during extended grade ascent or passing).

When the invention is used to supercharge ICE in vehicles such as trucks, busses, earth moving equipment, and utility vehicles that already have an existing supply of high-pressure air, such an existing supply of high pressure air may be used to operate the vortex tube 120. High-pressure air for operation of the vortex tube 120 may be also conveniently generated in ICE cylinders during vehicle braking, as for example, disclosed by Larson et al. in U.S. Pat. No. 6,922,997.

The term "intake air" used in this application should be give an broad interpretation so as to include presence of ICE fuel and ICE exhaust gases. Thus, intake air is essentially a mixture of nitrogen, oxygen, carbon dioxide, water vapor, and inert gases, and may also include ICE fuel vapor, nitrogen oxides, and hydrocarbons. In some embodiments of the invention the high-pressure air for operation of the vortex tube may be derived from the intake air, therefore, the composition of the high-pressure air may be essentially the same as that of the intake air.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," and "includes" and/or "including" when used in this specification, specify the presence of stated features, integers, steps, operations, elements, and/or components, but do not preclude the presence or addition of one or more other features, integers, steps, operations, elements, components, and/or groups thereof.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

Moreover, terms that are expressed as "means-plus function" in the claims should include any structure that can be utilized to carry out the function of that part of the present invention. In addition, the term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the present invention as defined in the appended claims. Furthermore, the foregoing description of the embodiments according to the present invention are provided for illustration only, and not for the purpose of limiting the present invention as defined by the appended claims and their equivalents. Thus, the scope of the present invention is not limited to the disclosed embodiments.

What is claimed is:

1. A supercharger assembly for an ICE comprising:
  (a) a vortex tube having an inlet port and a cold outlet port;
  (b) a driving nozzle;
  (c) a means for regulating mass flow rate of high-pressure air through said vortex tube;
  (d) a means for sensing ICE power demand; and
  (e) a control unit configured for operatively controlling said means for regulating mass flow of said high-pressure air in accordance with sensed ICE power demand;
  said cold outlet port being fluidly coupled to said nozzle; and
  said nozzle being adapted for inducing intake air into an ICE intake.

2. A supercharged internal combustion engine system comprising:
  an internal combustion engine (ICE), a flow control means an electronic control unit (ECU), and a vortex tube;
  said ICE having at least one combustion chamber and an intake passage;
  said intake passage being fluidly coupled to said combustion chamber and configured for flowing intake air thereinto;
  said intake passage being fluidly coupled to a source of intake air;
  said vortex tube having an inlet port fluidly coupled to a source of high-pressure air;
  said vortex tube having a cold outlet port fluidly coupled to said intake passage;
  said source of intake air being adapted for providing intake air at a first pressure;
  said source of high-pressure air being adapted for providing air at a second pressure;
  said second pressure being substantially greater than the first pressure;
  said flow control means for regulating the mass flow rate of said high-pressure air through said inlet port;
  said ECU operatively coupled to said flow control means; and said ECU regulating said mass flow rate to said inlet port according to a combination of parameters chosen from the group consisting of ICE output shaft torque, ICE rotational speed, intake passage pressure, intake passage temperature, intake air flow rate, fuel flow rate, vehicle speed, and position of accelerator pedal.

3. The supercharged internal combustion engine system as in claim 2, wherein said ECU is configured to increase said mass flow rate when ICE rotational speed is less than a predetermined ICE rotational speed value and ICE output torque is more than a predetermined ICE output torque value.

4. The supercharged internal combustion engine system as in claim 2, wherein said ECU is configured to decrease said mass flow rate when ICE rotational speed is more than a predetermined ICE rotational speed value and ICE output torque is less than a predetermined ICE output torque value.

5. The supercharged internal combustion engine system as in claim 2 wherein the ratio of said second pressure to said first pressure is at least 1.4.

6. The supercharged internal combustion engine system as in claim 2 wherein said vortex tube is being cooled by a medium selected from the group consisting of liquid coolant, ICE coolant, air, gaseous coolant, and phase change material.

7. The supercharged internal combustion engine system as in claim 2 further comprising a regulating valve configured for regulating the flow of intake air from said intake air source to said intake passage.

8. The supercharged internal combustion engine system as in claim 7 further comprising an electronic control unit (ECU) operatively coupled to said flow regulating valve for regulating intake air flow from said intake air source to said intake passage according to operating conditions of said ICE.

9. The supercharged internal combustion engine system as in claim 7 wherein said regulating valve is arranged to be closed when the mass flow rate of said high-pressure air through said inlet port is more than a first predetermined mass flow rate value and to be open when the mass flow rate of said high-pressure air through said inlet port is less than a second predetermined mass flow rate value.

10. The supercharged internal combustion engine system as in claim 7 wherein at least one of the closing speed and the opening speed of said regulating valve are controlled to produce substantially smooth variation in air density in said intake passage.

11. The supercharged internal combustion engine system as in claim 2 wherein said source of intake air is chosen from the group consisting of ambient atmosphere, engine driven supercharger, exhaust gas turbocharger, and electric turbocharger.

12. The supercharged internal combustion engine system as in claim 2 further comprising an ejector pump for pumping intake air into said intake passage; said ejector being disposed between said source of intake air and said intake passage; said ejector having at least one driving nozzle, a suction port, and a discharge port; said suction port being fluidly coupled to said source of intake air; said discharge port being fluidly coupled to said intake passage; and said driving nozzle fluidly being coupled to said cold outlet port of said vortex tube.

13. The supercharged internal combustion engine system as in claim 12 wherein said driving nozzle is chosen from the group consisting of a subsonic nozzle, sonic nozzle, supersonic nozzle, annular nozzle, lobed nozzle, supersonic lobed nozzle, variable area nozzle, and a pintle nozzle.

14. The supercharged internal combustion engine system as in claim 12 further comprising an ejector bypass duct and a bypass valve; said ejector bypass duct having a duct inlet fluidly coupled to said suction port and a duct outlet fluidly coupled to said intake passage; said bypass valve configured for controlling the air flow through said bypass duct.

15. The supercharged internal combustion engine system as in claim 14 wherein said bypass valve is arranged to be closed when mass flow rate of said high-pressure air through said inlet port is more than a predetermined mass flow rate value and to be open when mass flow rate of said high-pressure air through said inlet port is less than a predetermined mass flow rate value.

16. The supercharged internal combustion engine system as in claim 14 wherein said bypass valve is arranged to be closed when the difference between the air pressure at said duct outlet and the air pressure at said duct inlet is more than a predetermined pressure value, and to be open when the difference between the air pressure at said duct outlet and the air pressure at said duct inlet is less than a predetermined pressure value.

17. The supercharged internal combustion engine system as in claim 2 further comprising a cooling jacket in a good thermal contact with the exterior surface of said vortex tube and adapted for removing heat therefrom; said cooling jacket is configured for transferring heat from said vortex tube into a medium selected from the group consisting of liquid coolant, ICE coolant, gaseous coolant, air, and phase change material.

18. The supercharged internal combustion engine system as in claim 2 further comprising an intake duct and a driving nozzle; said intake duct having an upstream end and a downstream end; said upstream end being fluidly coupled to said source of intake air and configured to receive intake air therefrom; said downstream end being fluidly coupled to said intake passage; said driving nozzle being disposed inside said intake duct and configured to direct its discharge flow toward said downstream end; and said driving nozzle being fluidly coupled to said source of high-pressure air and configure to receive high-pressure air therefrom.

19. A supercharged internal combustion engine system comprising:
  (a) an internal combustion engine (ICE) having at least one combustion chamber, an intake passage; said intake passage being fluidly coupled to said combustion chamber and configured for flowing intake air thereinto; said intake passage fluidly coupled to a source of intake air;
  (b) a source of high-pressure air;
  (c) a vortex tube having an inlet port and a cold outlet port;
    i) said inlet port being fluidly coupled to said source of high-pressure air for admitting high-pressure air therefrom;
    ii) said cold outlet port being fluidly coupled to said intake passage;
    iii) said vortex tube being cooled by a medium selected from the group consisting of liquid coolant, ICE coolant, air, gaseous coolant, and phase change material;
  (d) a means for sensing ICE power demand;
  (e) means for varying the mass flow rate of said high-pressure air through said vortex tube in accordance with sensed ICE power demand; and
  (f) an electronic control unit (ECU) operatively coupled to said flow control means; said ECU being configured to increase said mass flow rate when a first operating condition is met, and to decrease said mass flow rate when a second operating condition is met;
wherein said first operating condition is chosen from the group consisting of:
  1) engine rotational speed is less than a predetermined engine rotational speed value and engine output torque is more than a predetermined engine output torque value, 2) engine rotational speed is less than a predetermined engine rotational speed value and engine fuel flow is more than a predetermined fuel flow value, and
3) the difference between the demand torque value and engine output torque value is more than a predetermined torque difference value,
4) the difference between the demand power value and engine output power value is more than a predetermined power difference value, and
5) the difference between the supercharger output air density value required to meet demanded power and the measured supercharger output air density value is more than a predetermined density difference value; and wherein said second operating condition is chosen from the group consisting of:

6) engine rotational speed is more than a predetermined engine rotational speed value and engine output torque is less than a predetermined engine output torque value,
7) engine rotational speed is more than a predetermined engine rotational speed value and engine fuel flow is less than a predetermined fuel flow value,
8) the difference between the engine output torque value and demand torque value is less more a predetermined torque difference value,
9) the difference between the engine output power value and demand power value is more than a predetermined power difference value, and
10) the difference between the measured supercharger output air density value and the supercharger output air density value required to meet demanded power is more than a predetermined density difference value.

20. The supercharged internal combustion engine system as in claim 19 further comprising an ejector pump for pumping intake air into said ICE; said ejector pump having a driving nozzle, a suction port, and a discharge port; said driving nozzle being fluidly coupled to said cold outlet port of said vortex tube and configured for admitting cold air therefrom; said suction port being fluidly coupled to a source of said intake air and configured receiving said intake air therefrom; and said discharge port being fluidly coupled to said intake passage and configured for flowing pressurized air thereinto.

21. The supercharged internal combustion engine system as in claim 19 further comprising an ejector bypass duct and a bypass valve; said ejector bypass duct having a duct inlet fluidly coupled to said suction port and a duct outlet fluidly coupled to said intake passage; and said bypass valve configured for controlling the air flow through said bypass duct.

* * * * *